(12) United States Patent
Tanaka et al.

(10) Patent No.: US 9,644,632 B2
(45) Date of Patent: May 9, 2017

(54) VOLTAGE APPLICATION DEVICE, ROTATION APPARATUS AND VOLTAGE APPLICATION METHOD

(71) Applicant: Kabushiki Kaisha Toshiba, Tokyo (JP)

(72) Inventors: Motofumi Tanaka, Yokohama (JP); Hisashi Matsuda, Tokyo (JP); Shohei Goshima, Yokohama (JP); Hiroyuki Yasui, Yokohama (JP); Amane Majima, Kawasaki (JP); Toshiki Osako, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 269 days.

(21) Appl. No.: 14/503,462

(22) Filed: Oct. 1, 2014

(65) Prior Publication Data

US 2015/0110651 A1    Apr. 23, 2015

Related U.S. Application Data

(63) Continuation of application No. 13/420,648, filed on Mar. 15, 2012, now Pat. No. 8,937,799.

(30) Foreign Application Priority Data

May 13, 2011    (JP) .................................. 2011-108537

(51) Int. Cl.
*F04D 25/06*    (2006.01)
*F04D 19/00*    (2006.01)
(Continued)

(52) U.S. Cl.
CPC .............. *F04D 25/06* (2013.01); *F01D 5/14* (2013.01); *F03D 7/00* (2013.01); *F04D 19/002* (2013.01);
(Continued)

(58) Field of Classification Search
CPC . F01D 5/14; F03D 7/00; F04D 29/324; F04D 29/388; F04D 29/681;
(Continued)

(56) References Cited

U.S. PATENT DOCUMENTS

| 5,598,326 A | 1/1997 | Liu et al. |
| 2004/0011917 A1 | 1/2004 | Saeks et al. |

(Continued)

FOREIGN PATENT DOCUMENTS

| EP | 2 520 800 A1 | 11/2012 |
| JP | 2008-25434 | 2/2008 |
| JP | 2008-291798 | 12/2008 |

OTHER PUBLICATIONS

Extended European Search Report issued by the European Patent Office on Jan. 15, 2015, for European Patent Application No. 12159457.6.

*Primary Examiner* — Thienvu Tran
*Assistant Examiner* — Kevin J Comber
(74) *Attorney, Agent, or Firm* — Finnegan, Henderson, Farabow, Garrett & Dunner, LLP

(57) ABSTRACT

A voltage application device of an embodiment applies a voltage between a first and second electrode disposed separately from each other in an airflow generation device, which is disposed on a rotation blade of a rotation apparatus, in which a rotation shaft of the rotation blade is held rotatably by a holding part. In the voltage application device of the embodiment, a voltage output unit outputs a voltage. Then, a sliding type transmission unit having electrodes disposed respectively on the rotation blade side and the holding part side of the rotation shaft transmits a voltage outputted from the voltage output unit from the holding part side to the rotation blade side. Then, a transformation unit disposed on the rotation blade side increases the voltage transmitted by
(Continued)

the sliding type transmission unit and outputs the voltage to the airflow generation device.

16 Claims, 17 Drawing Sheets

(51) Int. Cl.
    *H02M 7/02*       (2006.01)
    *F01D 5/14*        (2006.01)
    *F03D 7/00*        (2006.01)
    *F04D 29/32*      (2006.01)
    *F04D 29/38*      (2006.01)
    *F04D 29/68*      (2006.01)

(52) U.S. Cl.
    CPC ........... *F04D 29/324* (2013.01); *F04D 29/38* (2013.01); *F04D 29/388* (2013.01); *F04D 29/681* (2013.01); *F04D 29/687* (2013.01); *H02M 7/02* (2013.01); *B64C 2230/12* (2013.01); *F05D 2270/172* (2013.01); *Y02E 10/722* (2013.01); *Y02E 10/723* (2013.01); *Y02T 50/166* (2013.01)

(58) Field of Classification Search
    CPC ............. F04D 29/687; F05D 2270/172; Y02E 10/722; Y02E 10/723; Y02T 50/166; B64C 2230/12
    USPC ........................................................ 361/225
    See application file for complete search history.

(56) References Cited

U.S. PATENT DOCUMENTS

2008/0067283 A1    3/2008   Thomas
2010/0329838 A1   12/2010   Greenblatt

US 9,644,632 B2

VOLTAGE APPLICATION DEVICE, ROTATION APPARATUS AND VOLTAGE APPLICATION METHOD

CROSS-REFERENCE TO RELATED APPLICATION

This application is based upon and claims the benefit of priority from the prior Japanese Patent Application No. 2011-108537, filed on May 13, 2011; the entire contents of which are incorporated herein by reference.

FIELD

Embodiments described herein relate generally to a voltage application device, a rotation apparatus and a voltage application method.

BACKGROUND

There has been proposed a voltage supply device such that an airflow generation device using plasma is disposed on the surface of a rotation blade included in a rotation apparatus such as a fan, a windmill or a turbine, and a voltage is supplied to a rotation field. This voltage application device applies a voltage between a first electrode of the airflow generation device provided on the surface of the blade which rotates and a second electrode disposed separately from the first electrode, to thereby generate airflow between the first electrode and the second electrode. Thus, there is exerted an influence on the velocity distribution of a boundary layer on the surface of the rotation blade, and separation is suppressed and variation in flow velocity is reduced; thereby stabilizing the airflow, reducing noise and vibrations, and improving aerodynamic properties of the blade.

However, it has been found that there is a possibility of electromagnetic noise to be mixed in the airflow generation device. For example, when a high-frequency high voltage is transmitted via a sliding type transmission unit electrically connecting a rotation side and a fixed side of the rotation apparatus, a sliding part of the sliding type transmission unit varies irregularly in contact surface area and contact resistance due to irregularities of the sliding part and unevenness in pressing forces. Accordingly, small discharge occurs in the vicinity of the sliding part corresponding to this variation, and electromagnetic noise due to the discharge occurs. Thus, not only the influence of noise on other devices in the periphery arises, but also the electromagnetic noise mixes into power supplied to the airflow generation device. This causes operation of the airflow generation device to be unstable, and the effects such as reduction in noise and vibrations as well as efficiency improvement cannot be obtained sufficiently. Further, the transmission unit wears out due to the discharge in the sliding type transmission unit, which becomes a factor of increasing running costs.

DETAILED DESCRIPTION

A voltage application device of an embodiment applies a voltage between a first electrode and second electrode disposed separately from each other in an airflow generation device, which are disposed on a rotation blade of a rotation apparatus, in which a rotation shaft of the rotation blade is held rotatably by a holding part. In the voltage application device of the embodiment, a voltage output unit outputs a voltage. Then, a sliding type transmission unit having electrodes disposed respectively on the rotation blade side and the holding part side of the rotation shaft transmits a voltage outputted from the voltage output unit from the holding part side to the rotation blade side. Then, a transformation unit disposed on the rotation blade side increases the voltage transmitted by the sliding type transmission unit and outputs the voltage to the airflow generation device.

Embodiment 1

Figure 1:
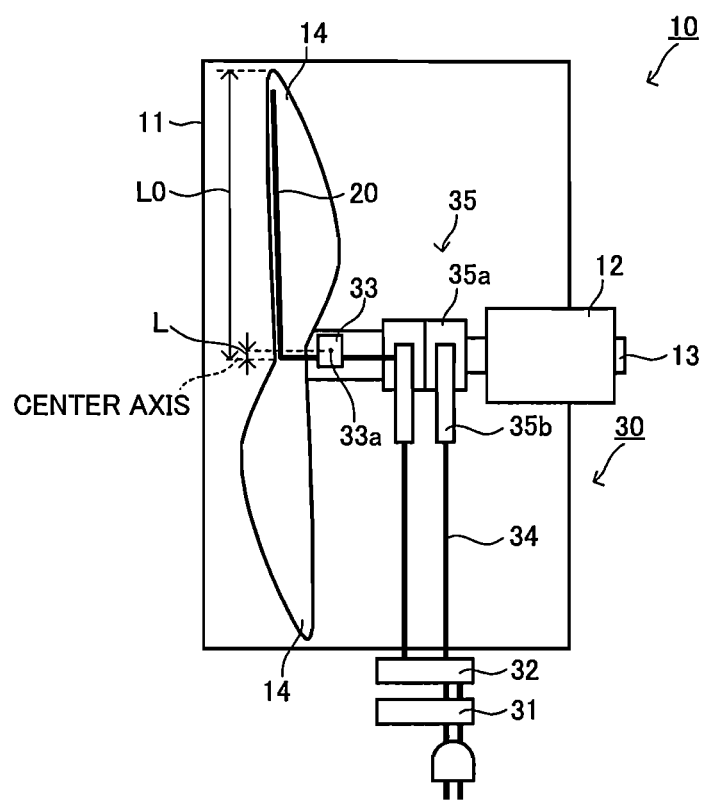
FIG. 1 is a side view illustrating a structure of a voltage application device of one embodiment.

Hereinafter, an embodiment of the present invention will be described with reference to the drawings. FIG. 1 is a side view illustrating a structure of a voltage application device 30 according to one embodiment.

As illustrated in FIG. 1, this voltage application device 30 is disposed in a fan 10 which is a rotation apparatus. This fan 10 is a small fan for household use for example, and has a casing (case) 11, a bearing (holding part) 12 attached to the casing 11, a rotation shaft 13 supported rotatably by the bearing 12, and a plurality of blades (rotation blade) 14 attached to an end portion of the rotation shaft 13 and rotating together with the rotation shaft 13. On a surface of at least one blade 14 among the plurality of blades 14, an airflow generation device 20 generating plasma above the blades 14 is disposed, and a high-frequency high voltage is applied thereto by the voltage application device 30.

Figure 2:
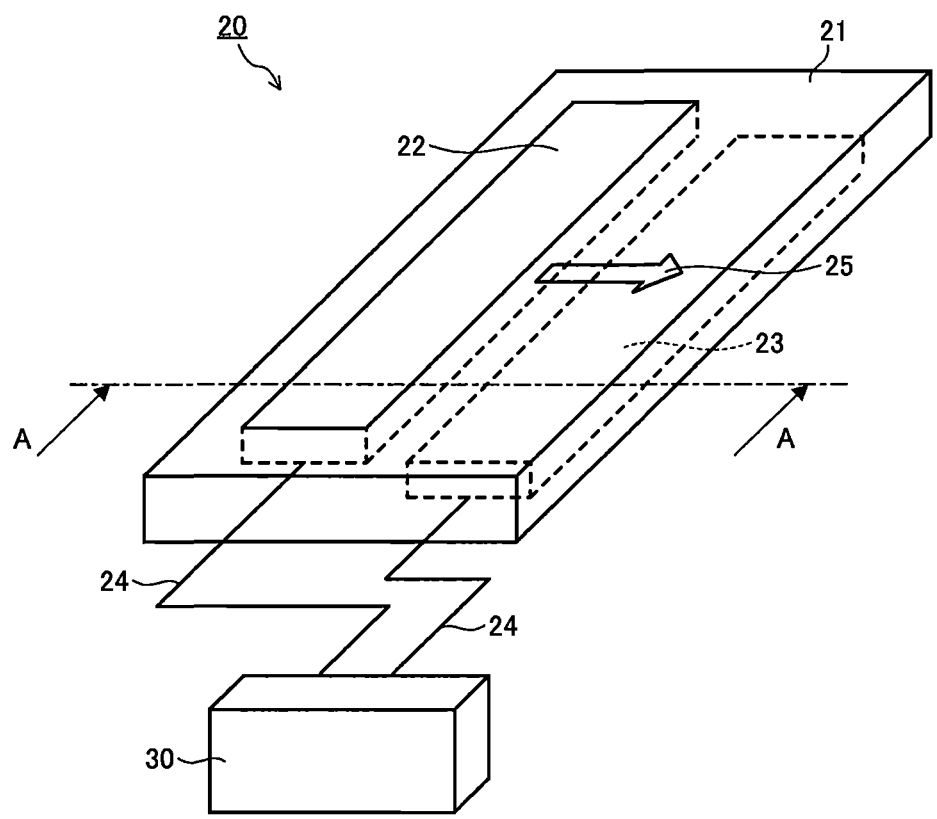
FIG. 2 is a perspective view schematically illustrating an airflow generation device.
Figure 3:
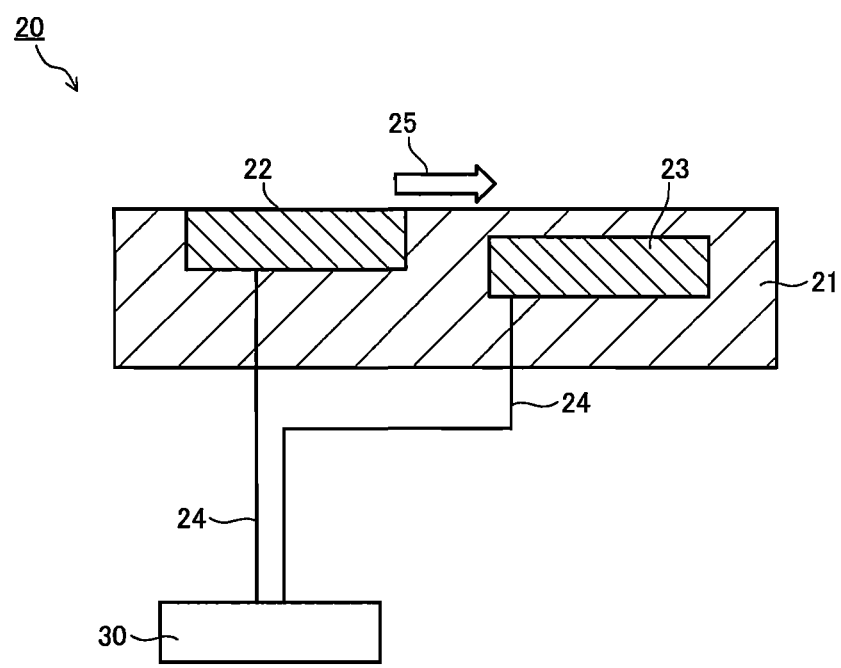
FIG. 3 is a cross-sectional view illustrating an A-A cross section of FIG. 2.

FIG. 2 is a perspective view schematically illustrating the airflow generation device 20. FIG. 3 is a cross-sectional view illustrating an A-A cross section of FIG. 2.

As illustrated in FIG. 2 and FIG. 3, the airflow generation device 20 has an electrode 22 (first electrode) exposed on a surface of a dielectric 21, and an electrode 23 (second electrode) which differs from the second electrode 22 in distance from the surface of the dielectric 21, is separated by shifting in a horizontal direction from the surface of the dielectric 21, and is embedded in the dielectric 21. Between the pair of electrodes 22, 23, a voltage application device 30 applying a voltage is connected via cables 24. The dielectric 21 and the pair of electrodes 22, 23 are disposed on the surface of the blade 14 to extend along a longitudinal direction (see FIG. 1).

In this airflow generation device 20, when a high-frequency high voltage is applied between the pair of electrodes 22, 23 by the voltage application device 30, discharge occurs between the pair of electrodes 22, 23, and discharge plasma occurs accompanying this discharge. Here, since the dielectric 21 intervenes between the pair of electrodes 22, 23, there occurs dielectric barrier discharge, which does not reach arc discharge and is able to be maintained stably. This dielectric barrier discharge becomes creeping discharge formed along the dielectric 21. By this dielectric barrier discharge, airflow 25 flowing in an arrow direction illustrated in FIG. 2 and FIG. 3 can be generated along the surface of the airflow generation device 20, that is, the surface of the dielectric 21. This generated airflow 25 enables airflow control effects such as flow separation suppression, suppression of noise and vibrations, and the like around the blade 14.

Figure 4:
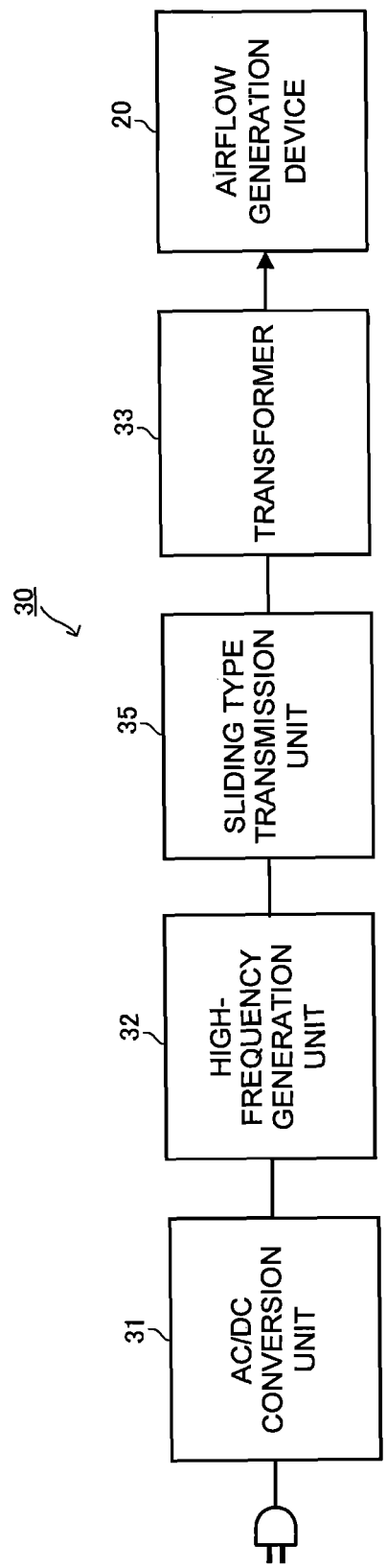
FIG. 4 is a block diagram illustrating a structure of an electric circuit of the voltage application device.

FIG. 4 is a block diagram illustrating a structure of an electric circuit of the voltage application device 30.

As illustrated in FIG. 4, the voltage application device 30 includes an AC/DC conversion unit 31 converting an alternating voltage into a direct-current voltage, a high frequency generation unit 32 generating a high-frequency voltage, and a transformer 33 connected to the high frequency generation unit 32 via a sliding type transmission unit 35 (see FIG. 1) and generating a high-frequency high voltage.

As illustrated in FIG. 1, the AC/DC conversion unit 31 is disposed in the casing 11. The AC/DC conversion unit 31 converts, for example, a sinusoidal low voltage (AC) of a commercial frequency into a direct-current voltage (DC) via a not-illustrated diode and so on. The AC/DC conversion unit 31 functions as a voltage conversion unit converting an alternating voltage into a direct-current voltage. Note that regarding the alternating voltage, it is desired to use a triphase alternating voltage for suppressing ripples to be low.

The high frequency generation unit 32 is disposed in the casing 11 as illustrated in FIG. 1. The high frequency generation unit 32 is activated by a direct-current voltage supplied by, for example, switching using a IGBT (Insulated Gate Bipolar Transistor) or FET (Field-Effect Transistor) to generate high frequency pulses, and generate a high-frequency alternating voltage of about 1 [kHz] to 20 [kHz]. The high frequency generation unit 32 is connected electrically to the sliding type transmission unit 35 via cables 34. This high frequency generation unit 32 has a function to generate a high-frequency component based on a direct-current voltage converted by the voltage conversion unit.

The sliding type transmission unit (for example, slip ring) 35 has, as illustrated in FIG. 1, two rings (electrodes) 35a attached to the rotation shaft 13 of the fan 10 and rotating with this rotation shaft 13, and two brushes (sliding contacts) 35b paired with the rings 35a and connected electrically to the high frequency generation unit 32. The two rings 35a are disposed on the blades 14 (rotation blade) side and the bearing 12 (holding part) side on the rotation shaft 13, insulated electrically from each other, and both connected to the transformer 33. In the two pairs of a ring 35a and a brush 35b, the ring 35a and the brush 35b are in electrical contact with each other, and have a function to transmit the high-frequency alternating voltage outputted from the high frequency generation unit 32 to the transformer 33. That is, the sliding type transmission unit 35 transmits the voltage from the side of the bearing 12 (holding part) to the side of the blades 14 (rotation blade). Note that the brush may be disposed on the rotation shaft and the ring, which is in electrical contact with the brush, may be disposed on the holding part side.

The transformer 33 is disposed on the rotation shaft 13 on the blades 14 side with respect to the rings 35a, as illustrated in FIG. 1. The transformer 33 increases the high-frequency alternating voltage of 100 [v] to 400 [v] for example transmitted from the rings 35a to a high-frequency high voltage of several [kV] and outputs the voltage to the airflow generation device 20. The transformer 33 is disposed on the rotation shaft 13 so that the center of gravity thereof substantially matches a center axis of the rotation shaft 13 of the fan 10. The transformer 33 has a function to convert the voltage outputted from the sliding type transmission unit 35 into a high-frequency high voltage and output the voltage to the airflow generation device 20. Note that the above-described substantially match refers to that, for example, a distance L between the center axis of the rotation shaft 13 and the center of gravity 33a of the transformer 33 is equal to or smaller than 5% of a distance (hereinafter referred to as "blade length") L0 between the center axis of the rotation shaft 13 and the front end of the blades 14.

That is, in this embodiment, the transformer 33 is disposed on, for example, the center axis of an end portion on the blades 14 side of the rotation shaft 13 so that the center of gravity thereof substantially matches the center axis of the rotation shaft 13, and the AC/DC conversion unit 31 and the high frequency generation unit 32 are disposed on the holding side (casing 11) of the fan 10. The high frequency generation unit 32 then generates a high-frequency alternating voltage based on the direct-current voltage generated in the AC/DC conversion unit 31, and this high-frequency alternating voltage can be supplied to the transformer 33 via the sliding type transmission unit 35. The transformer 33 converts the high-frequency alternating voltage transmitted from the sliding type transmission unit 35 into a high-frequency high voltage, and outputs it to the airflow generation device 20.

In this airflow generation device 20, when the high-frequency high voltage is applied from the voltage application device 30 to the pair of electrodes 22, 23, discharge occurs between the pair of electrodes 22, 23, and discharge plasma can be generated accompanying this discharge. Then, by this plasma generated, airflow 25 can be generated along the surface (blade 14) of the airflow generation device 20.

Thus, in this embodiment, the high-frequency high voltage can be applied to the airflow generation device 20 without applying a high voltage to the sliding type transmission unit 35 (rings 35a). Accordingly, the high-frequency high voltage can be supplied stably with low noise even while the rotation apparatus is operating (see experimental results which will be described later). As a result, operation of the airflow generation device becomes stable, and the airflow around the blades 14 is stabilized, thereby achieving reduction in noise and vibrations. Further, occurrence of noise due to discharge in sliding type contacts can be prevented, and wearing of contacts can be reduced.

Further, in this embodiment, the transformer 33 having a large weight is disposed on the rotation shaft 13 so that its center of gravity substantially matches the center axis of the rotation shaft 13. Thus, moment applied to a supporting part of the transformer 33 and a rotation center can be suppressed small, and improvement in durability and reduction in vibrations and noise can be achieved.

Further, the transformer 33 is separate from the other parts of the voltage application device 30. The transformer 33 is disposed on the holding part (bearing 12) side, and then the other parts are disposed on the rotation blade (blades 14) side. Thus, an increase of weight of the rotation blade (blades 14) side can be suppressed least. As a result, the simplified structure of the bearing 12, a long life, a low cost, a lowering of moment applied to the rotation part, and simplification of designing can be achieved.

Note that when the input to the voltage application device 30 is a direct-current voltage, it is possible to provide a DC/DC conversion unit to increase this direct-current voltage to a predetermined voltage value, instead of the AC/DC conversion unit 31. Or when the direct-current voltage inputted to the voltage application device 30 is of a predetermined voltage value, both the AC/DC conversion unit 31 and the DC/DC conversion unit may be omitted.

By such a structure, it is possible to reduce the number of parts along with reduction in production cost of the voltage application device 30. For example, when this voltage application device 30 is used for a large windmill for wind power generation system which will be described later, it may be possible to extract the above-described direct-current voltage and input it to the voltage application device 30, which allows to reduce the production cost of the above-described voltage application device 30 and the number of parts.

Embodiment 2

Figure 5:
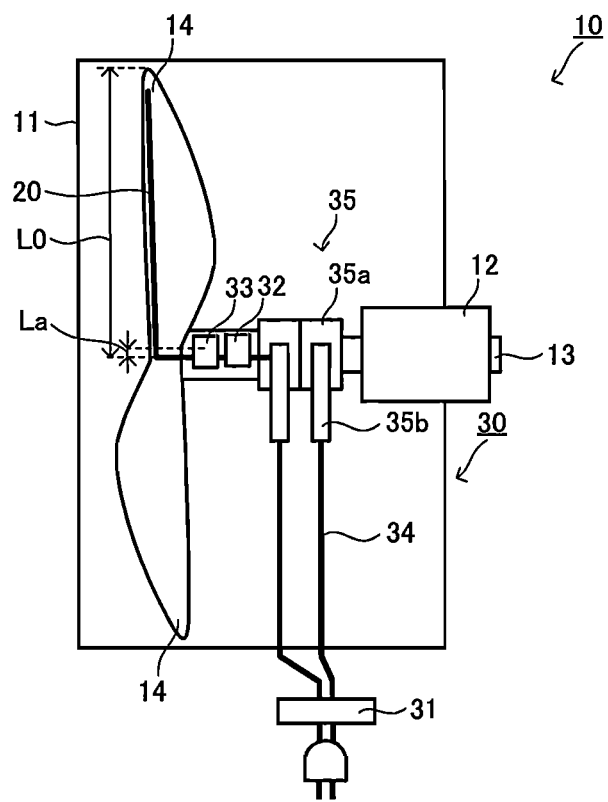
FIG. 5 is a side view illustrating a structure of a voltage application device of Embodiment 2.

FIG. 5 is a side view illustrating a structure of the voltage application device 30 of Embodiment 2.

As illustrated in FIG. 5, structures of the fan 10 and the airflow generation device 20 are similar to those in FIG. 1, but an arrangement structure of the voltage application device 30 is different. Specifically, in this voltage application device 30, among the AC/DC conversion unit 31, the high frequency generation unit 32 and the transformer 33 which are necessary for driving the airflow generation device 20, the high frequency generation unit 32 and the transformer 33 are disposed on the rotation shaft 13 on the blades 14 side with respect to the rings 35a.

The high frequency generation unit 32 and the transformer 33 are disposed on the rotation shaft 13 so that their combined center of gravity substantially matches the center axis of the rotation shaft 13 of the fan 10. The direct-current voltage generated in the AC/DC conversion unit 31 is outputted to the high frequency generation unit 32 via the sliding type transmission unit 35.

That is, to increase the durability of the brushes, it is desired to make the contact area of the rings 35a and the brushes 35b as small as possible. However, when this contact area becomes small, it is possible that application of voltage is momentarily interrupted due to vibrations, wear, and the like. Thus, when the voltage in which interruption of application occurred is supplied as it is to the transformer 33, a momentary variation occurs also in the voltage supplied to the airflow generation device 20, and stable plasma discharge can no longer be maintained.

Then, by disposing the high frequency generation unit 32 on the rotation shaft 13 on the blades 14 side with respect to the sliding type transmission unit 35 (rings 35a), a filter function which the high frequency generation unit 32 has for obtaining a predetermined frequency band can be utilized. By this filter function, the momentary variation of the direct-current voltage is no longer transmitted to the transformer 33, the voltage supplied to the airflow generation device 20 becomes stable, and stable plasma discharge can be maintained. As a result, the airflow 25 can be generated without interruption along the surface of the airflow generation device 20. The generated airflow 25 allows stable rotation of the blades 14. Note that the structures of the high frequency generation unit 32 and the transformer 33 will be described in detail in FIG. 12A which will be described later.

Incidentally, this high frequency generation unit 32 has a filter function for obtaining a predetermined frequency band, but this filter function may be of a separate body. In this case, the filter function, the high frequency generation unit and the transformer are disposed on the rotation shaft 13 on the blades 14 side with respect to the rings 35a so that their combined center of gravity thereof substantially matches the center axis of the rotation shaft 13. Further, it is also possible to dispose only the filter function on the rotation shaft 13 on the blades 14 side, and to dispose the high frequency generation unit 32 on the holding side of the fan 10. Note that the above-described substantially match refers to that, for example, a distance La between the center axis and the combined center of gravity of the high frequency generation unit 32 and the transformer 33 is equal to or smaller than 5% of the blade length L0.

That is, in this embodiment, the high frequency generation unit 32 and the transformer 33 are disposed on this rotation shaft 13 so that their combined center of gravity substantially matches the center axis of the rotation shaft 13, and the direct-current voltage outputted from the AC/DC conversion unit 31 is supplied to the high frequency generation unit 32 via the sliding type transmission unit 35.

Thus, in this embodiment, even when there occurs momentary application interruption of the voltage, the filter function of the high frequency generation unit 32 prevents the momentary variation of the direct-current voltage from being transmitted to the transformer 33, and the high-frequency high voltage can be supplied stably with low noise even while the rotation apparatus is operating. As a result, voltage supply to the airflow generation device 20 becomes stable, and stable plasma discharge can be maintained.

Further, in this embodiment, the high frequency generation unit 32 and the transformer 33 are disposed on the rotation shaft 13 so that their combined center of gravity substantially matches the center axis of the rotation shaft 13. Thus, moment applied to the supporting part of the transformer 33 and the rotation center of the rotation shaft 13 can be suppressed small, and improvement in durability and reduction in vibrations and noise can be achieved.

Note that, in this embodiment, the AC/DC conversion unit 31 is disposed on the holding part (bearing 12) side. However, the AC/DC conversion unit 31 may be disposed on the rotation blade (blades 14) side, and then the sinusoidal low voltage (AC) of a commercial frequency may be supplied to the AC/DC conversion unit 31 via the sliding type transmission unit 35.

Embodiment 3

Figure 6:
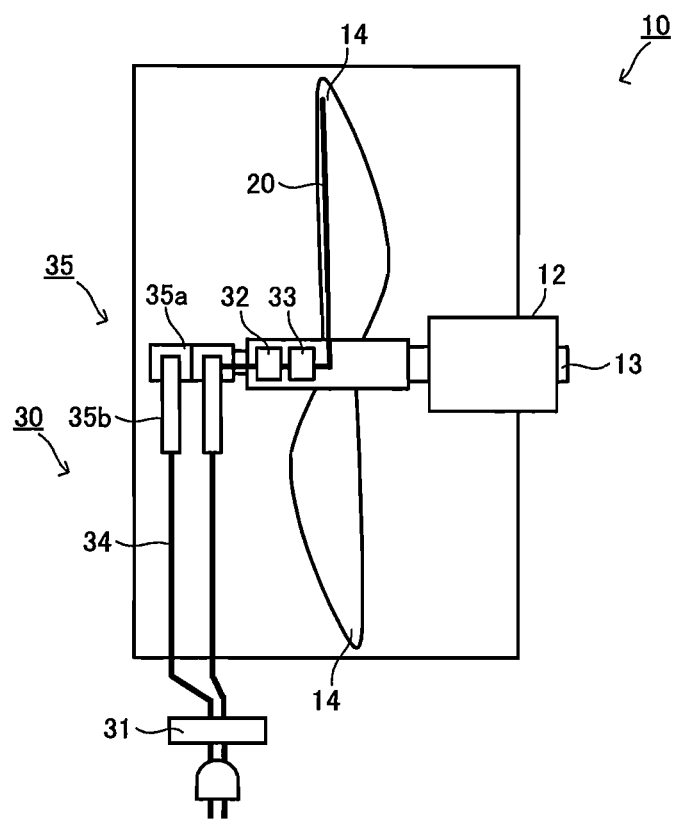
FIG. 6 is a side view illustrating a structure of a voltage application device of Embodiment 3.
Figure 7:
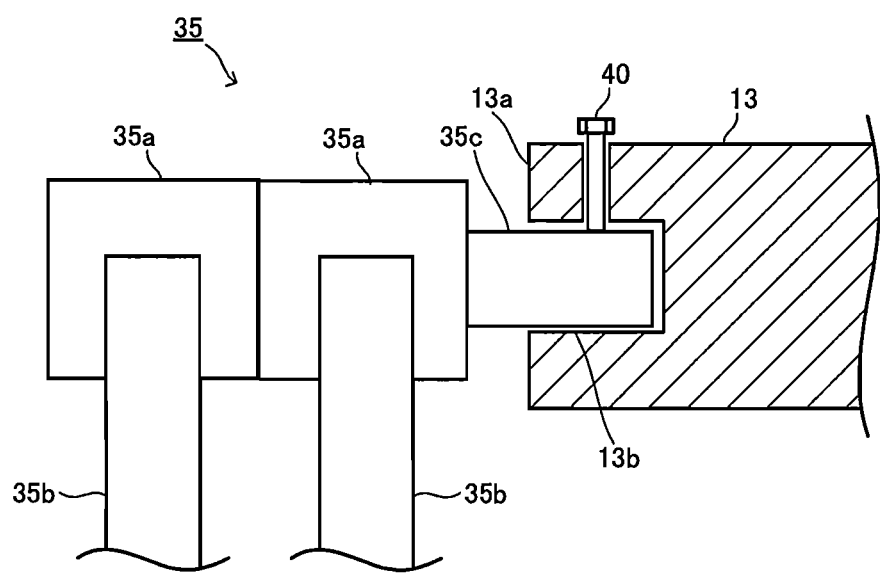
FIG. 7 is an enlarged cross-sectional view illustrating an attached state of a rotation shaft and a slip ring of FIG. 6.

FIG. 6 is a side view illustrating a structure of the voltage application device 30 of Embodiment 3. FIG. 7 is an enlarged cross-sectional view illustrating an attached state of the rotation shaft 13 and a slip ring (sliding type transmission unit) 35 of FIG. 6.

As illustrated in FIG. 6 and FIG. 7, the structures of the fan 10 and the airflow generation device 20 are similar to those in FIG. 1, but an arrangement structure of the voltage application device 30 is different. Specifically, in this voltage application device 30, rings 35a of the slip ring 35 are attached to an end portion 13a on a side opposite to the bearing 12 side of the rotation shaft 13, brushes 35b are in electrical contact with the rings 35a, and a direct-current voltage outputted from the AC/DC conversion unit 31 is supplied to the high frequency generation unit 32 via the sliding type transmission unit 35.

An attachment state of the rotation shaft 13 and the slip ring 35 will be described. As illustrated in FIG. 7, the rings 35a of the slip ring 35 are disposed and fixed onto one end side in a longitudinal direction of an attachment shaft 35c. Further, a hole 13b in which an end of the attachment shaft 35c can fit is provided in a center portion of the end portion 13a of the rotation shaft 13.

Upon attachment, the other end in the longitudinal direction of the attachment shaft 35c is inserted and fitted in the hole 13b of the end portion 13a of the rotation shaft 13, and further, the attachment shaft 35c can be fixed to the end portion 13a of the rotation shaft 13 using a screw 40.

Thus, in this embodiment, the attachment shaft 35c to which the rings 35a are fixed is fitted in the hole 13b of the end portion 13a of the rotation shaft 13. Thus, the radius of rotation of the rings 35a can be made small and a sliding distance per rotation can be made short, as compared to the case of FIG. 1 where the rings 35a are attached directly to the rotation shaft 13. In the case of FIG. 1, the rotation shaft 13 needs to mechanically support the rotational structure of the fan 10, and hence is one having a round bar shape with a necessary thickness. When the slip ring 35 is disposed thereon as in FIG. 1, it is necessary to make the diameter of the rings 35a larger than the diameter of the round bar, and a sliding distance per rotation becomes large. In the structure as illustrated in FIG. 7, the round bar to which the slip ring 35 is attached becomes as denoted by 35c, and this round bar just needs to have strength for supporting only the rotational structure of the slip ring 35. Accordingly, a thin round bar can be used, and the diameter of the rings 35a to be attached thereto can also be made small, making the sliding distance per rotation short.

Thus, the wearing ratio of the brushes 35b when the rotation shaft 13 is rotated at the same rotation speed can be reduced more than in the case of FIG. 1, and the usable life of the sliding type transmission unit 35 can be improved.

Further, in this embodiment, similarly to Embodiment 1, the high-frequency high voltage can be supplied stably with low noise even while the rotation apparatus is operating.

Also in this embodiment, the high frequency generation unit 32 and the transformer 33 are disposed on the rotation shaft 13 so that their combined center of gravity substantially matches the center axis of the rotation shaft 13. Thus, moment applied to the supporting part of the transformer 33 and the rotation center of the rotation shaft 13 can be suppressed small, and improvement in durability and reduction in vibrations and noise can be achieved.

Note that also in this embodiment, similarly to Embodiment 2, the above-described substantially match refers to that, for example, the distance La between the center axis and the combined center of gravity of the high frequency generation unit 32 and the transformer 33 is equal to or smaller than 5% of the blade length L0 (see FIG. 5).

Further, in this embodiment, the AC/DC conversion unit 31 is disposed on the holding part (bearing 12) side. However, the AC/DC conversion unit 31 may be disposed on the rotation blade (blades 14) side, and then the sinusoidal low voltage (AC) of a commercial frequency may be supplied to the AC/DC conversion unit 31 via the sliding type transmission unit 35.

Embodiment 4

Figure 8:
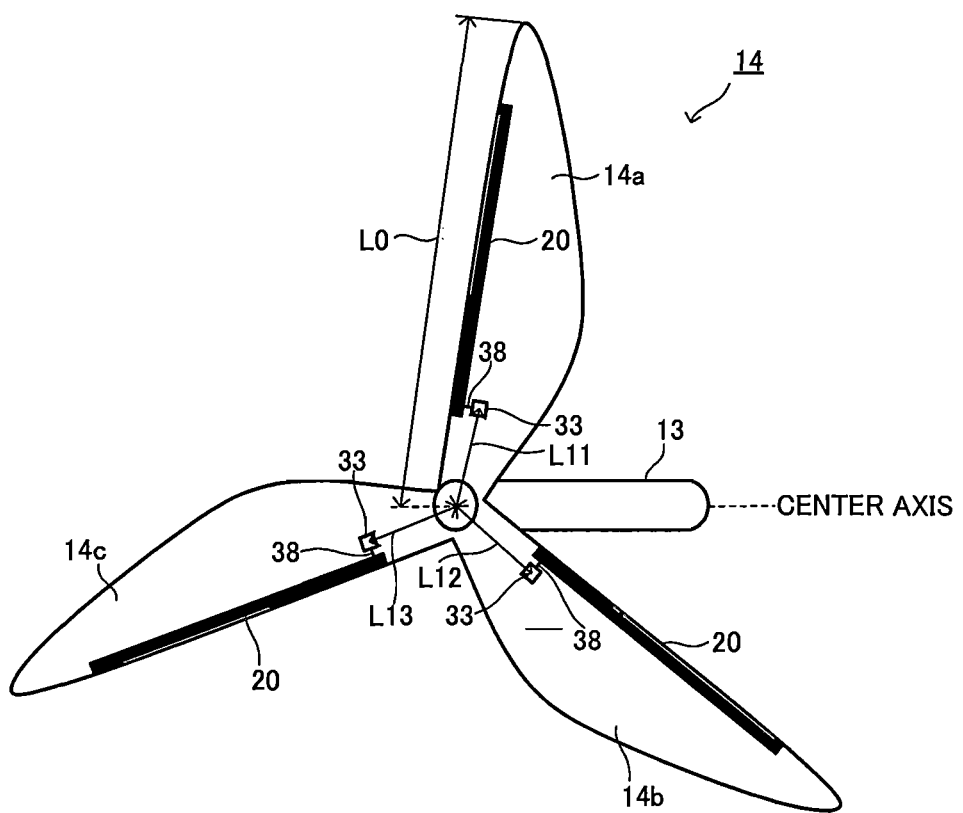
FIG. 8 is a perspective view illustrating one embodiment of blades illustrated in FIG. 1.

FIG. 8 is a perspective view illustrating one embodiment of the blades illustrated in FIG. 1. The blades 14 of the fan 10 illustrated in FIG. 1 are plural blades disposed on the rotation shaft 13 so that they are at equal angles from each other in a radial direction of the rotation shaft 13, as illustrated in FIG. 8 for example, and there are three blades 14a to 14c in the embodiment. These blades 14a to 14c are structured integrally with the rotation shaft 13. Note that although the blades 14 of the fan 10 in this embodiment are constituted of three blades, they are not limited thus.

On surfaces of the respective blades 14a to 14c the airflow generation devices 20 are disposed respectively, and the transformers 33 are disposed respectively in the vicinities of the airflow generation devices 20 and are connected electrically to the airflow generation devices 20. The respective transformers 33 are disposed on the respective blades 14a to 14c so that their combined center of gravity substantially matches the center axis of the rotation shaft 13. In this embodiment, the transformers 33 are disposed respectively on the respective blades 14a to 14c so as to have, for example, substantially the same weight at substantially equal intervals from the center axis of the rotation shaft 13, thereby making the above-described combined center of gravity substantially match the center axis of the rotation shaft 13.

Note that the substantially match refers to, for example, satisfying $L11/L0 \leq 5/100$ where $L11$ is the distance between the center axis of the rotation shaft 13 and the combined center of gravity of the transformers 33 of the respective blades 14a to 14c, and $L0$ is the blade length.

Further, the substantially equal intervals refer to that, for example, the distances from the center axis of the rotation shaft 13 to the transformers 33 of the respective blades 14a to 14c satisfy $L11/L0 \leq 1/5$, $L12/L0 \leq 1/5$, and $L13/L0 \leq 1/5$, respectively.

In this embodiment, the high-frequency high voltage can be supplied to the respective airflow generation devices 20 from the three transformers 33 of small size and light weight, as compared to the case where the high-frequency high voltage is supplied from one transformer 33 having a large weight to the three airflow generation devices 20. Thus, it becomes possible to distribute the weight, moment applied to the supporting part of the transformer 33 and the rotation center of the rotation shaft 13 can be suppressed small, and improvement in durability and reduction in vibrations and noise can be achieved. As a result, the high-frequency high voltage can be supplied stably with low noise even while the rotation apparatus is operating.

Further, in this embodiment, since the respective transformers 33 can be disposed respectively in the vicinities of the airflow generation devices 20, wires 38 for connecting the transformers 33 and the airflow generation devices 20 can be shortened to be a minimum, and entrance of noise from these wires can be prevented. As a result, the high-frequency high voltage can be supplied more stably with low noise even while the rotation apparatus is operating.

(Application)

Figure 9:
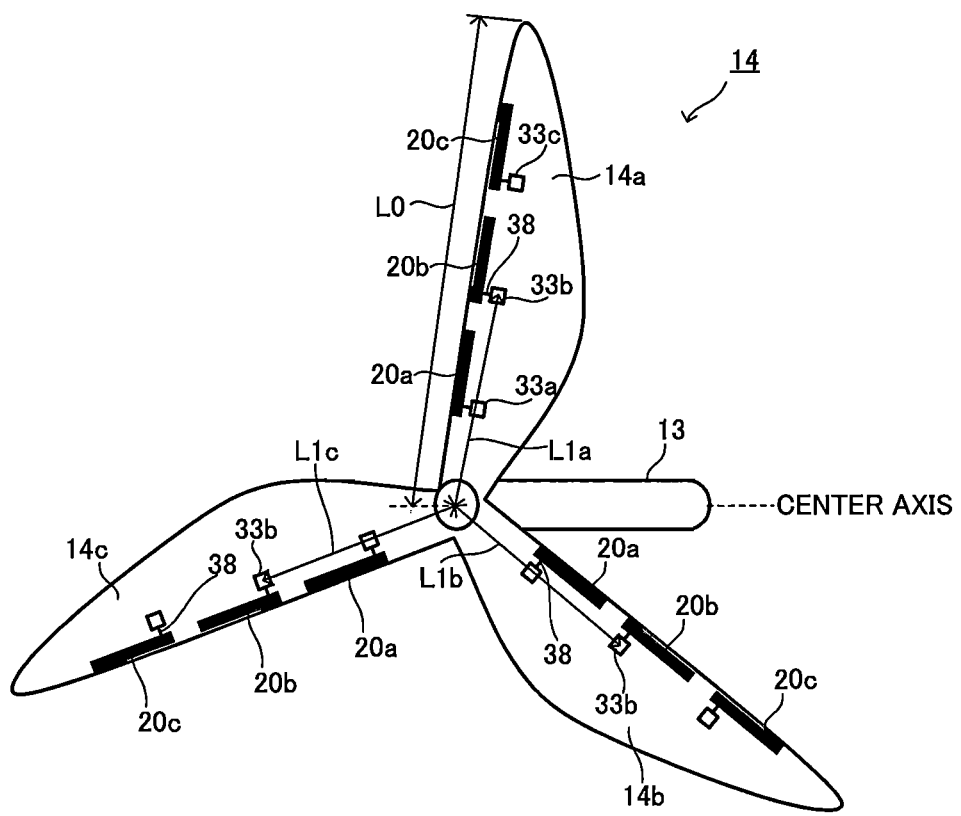
FIG. 9 is a perspective view illustrating an application of airflow generation devices and transformers disposed on the blades illustrated in FIG. 8.

FIG. 9 is a perspective view illustrating an application of airflow generation devices 20 and transformers 33 disposed on the blades 14 illustrated in FIG. 8. In this application, an arrangement structure of the airflow generation devices 20 and the transformers 33 are different from FIG. 8.

Specifically, as illustrated in FIG. 9, in this application, the airflow generation devices disposed on the respective blades 14a to 14c are divided into, for example, three airflow generation devices 20a to 20c and are disposed respectively thereon. Accompanying this, transformers 33a to 33c are disposed in the vicinities of the airflow generation devices 20a to 20c respectively, and the transformers 33a to 33c are connected electrically to the airflow generation devices 20a to 20c.

The plural transformers 33a to 33c are disposed respectively on the respective blades 14a to 14c so that, for example, with the centers of gravity of respective transformers 33b on the respective blades 14a to 14c being obtained, the center of gravity further combining the obtained respective centers of gravity substantially matches the center axis of the rotation shaft 13. In this embodiment, the transformers 33a to 33c are disposed respectively on the respective blades 14a to 14c so as to have, for example, substantially the same weight at substantially equal intervals from the center axis of the rotation shaft 13, thereby making the above-described combined center of gravity substantially match the center axis of the rotation shaft 13.

Note that in this application, the airflow generation devices 20 disposed on the respective blades 14a to 14c are structured by dividing into three, but it is not limited thus. Further, also in this application, similarly to Embodiment 4, the substantially match refers to, for example, satisfying L1a/L0≤5/100 where L1a is the distance between the center axis of the rotation shaft 13 and the combined center of gravity of the transformers 33b of the respective blades 14a to 14c, and L0 is the blade length.

Further, the substantially equal intervals refer to that, for example, the distances from the center axis of the rotation shaft 13 to the transformers 33 of the respective blades 14a to 14c satisfy L1a/L0≤1/5, L1b/L0≤1/5, and L1c/L0≤1/5, respectively.

In this application, the transformers 33 having a smaller size and less weight than the above-described transformers 33 illustrated in FIG. 8 can be used, and it becomes possible to distribute the weight. Thus, moment applied to the supporting part of the transformer 33 and the rotation center can be suppressed small, and improvement in durability and reduction in vibrations and noise can be achieved. As a result, the high-frequency high voltage can be supplied stably with low noise even while the rotation apparatus is operating.

Further, in this application, the airflow generation devices 20 and the transformers 33 can be divided and disposed on one blade. Thus, it is possible to use airflow generation devices and transformers which have a smaller size and less weight and cost less than the airflow generation devices 20 and the transformers 33 of Embodiment 4 illustrated in FIG. 8.

Embodiment 5

Figure 10:
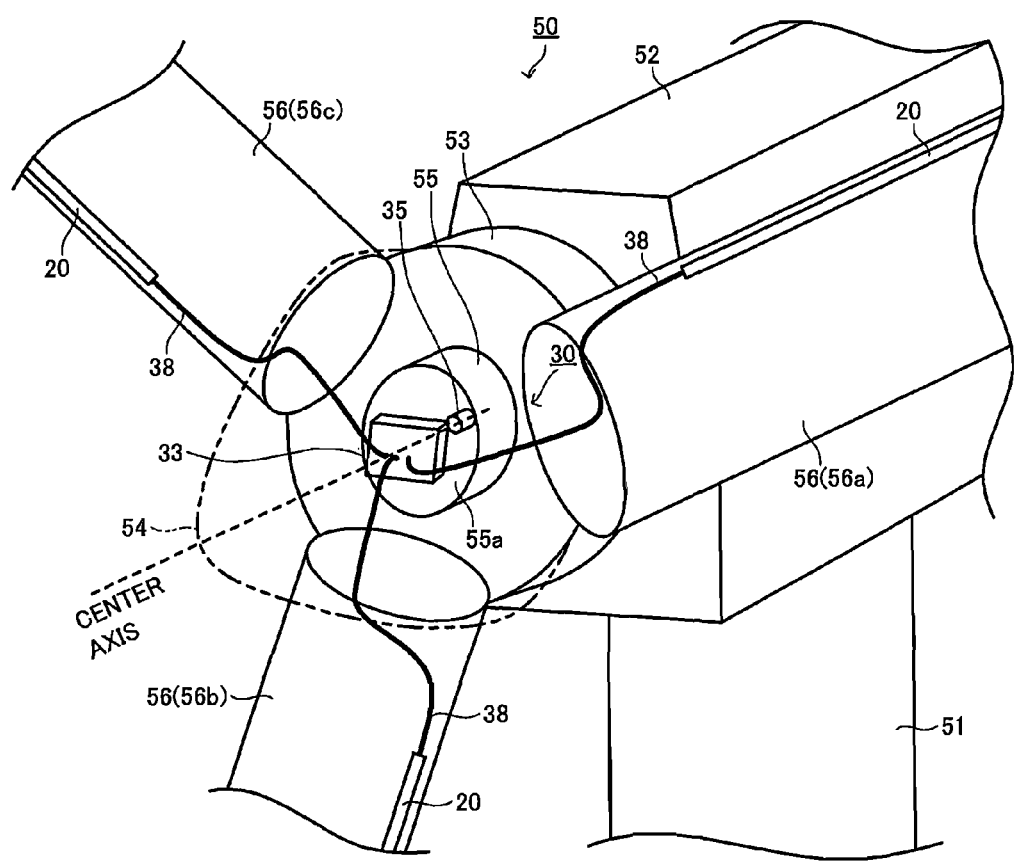
FIG. 10 is a perspective view illustrating a part of a large windmill of a wind power generation system of one embodiment.

FIG. 10 is a perspective view illustrating a part of a large windmill 50 of a wind power generation system of MW (megawatt) class of one embodiment.

As illustrated in FIG. 10, the large windmill 50 has a cylindrical tower 51 installed perpendicularly on the ground which is not illustrated, and a rectangular parallelepiped nacelle 52 attached to a top portion of this tower 51 and housing a not-illustrated power generator and so on. Moreover, at a front end of the nacelle 52, a hub 53 and a nose cone 54 are disposed on one end of the nacelle 52. A rotation shaft 55 projecting from the nacelle 52 is provided in a center portion of the hub 53, and a blade 56 is disposed on an outer peripheral surface of the nose cone 54 (or the hub 53). The hub 53 and the nose cone 54 rotate together with the rotation shaft 55.

This blade 56 has, for example, three blades 56a to 56c, and on surfaces of the blades 56a to 56c, airflow generation devices 20 are disposed respectively to extend in a longitudinal direction of the blades. The blades 56a to 56c are disposed on the outer peripheral surface of the nose cone 54 to be at angles substantially equal to each other. Note that although the blade 56 of the large windmill 50 is generally constituted of three blades 56a to 56c, it is not limited thus.

In an end portion 55a of the nose cone 54 side of the rotation shaft 55, a transformer 33 and a sliding type transmission unit 35 are provided.

The transformer 33 has a large weight, and is disposed in the end portion 55a of the rotation shaft 55 and in a center portion of the hub 53 so that the center of gravity of the transformer substantially matches the center axis of the rotation shaft 55 of the generator (large windmill 50). Note that similarly to Embodiment 1, the above-described substantially match refers to that, for example, a distance L between the center axis of the rotation shaft 55 and the center of gravity of the transformer 33 is equal to or smaller than 5% of the blade length L0 (not illustrated) of the blade 56 (see FIG. 1).

The sliding type transmission unit 35 is disposed in the center portion of the rotation shaft 55 similarly to Embodiment 1. Note that the sliding type transmission unit 35 has a small radius of rotation and a light weight, and hence does not affect moment applied to the rotation center of the rotation shaft 13.

That is, in this embodiment, the transformer 33 is disposed in the center portion of the end portion 55a of this rotation shaft 55 so that its center of gravity substantially matches the center axis of the rotation shaft 55, and an AC/DC conversion unit 31 and a high frequency generation unit 32 are disposed on a holding side (nacelle 52) of the large windmill 50. Then, the high frequency generation unit 32 generates a high-frequency alternating voltage based on a direct-current voltage generated in the AC/DC conversion unit 31, and this high-frequency alternating voltage can be supplied to the transformer 33 via the sliding type transmission unit 35. The transformer 33 converts the high-frequency alternating voltage from the sliding type transmission unit 35 into a high-frequency high voltage and outputs it to the airflow generation devices 20.

In the airflow generation devices 20, when the high-frequency high voltage from the voltage application device 30 is applied between a pair of electrodes 22, 23 (see FIG. 2 and FIG. 3), discharge occurs between this pair of electrodes 22, 23, and discharge plasma can be generated accompanying this discharge. Then, by this plasma generated, airflow 25 (see FIG. 2 and FIG. 3) can be generated along the surface (blade 56) of the airflow generation device 20.

In this large windmill 50, the output of the voltage application device for the airflow generation device 20 is about several [kW], and the size and weight of the transformer 33 is large compared to an apparatus in the nose cone 54 of conventional windmills.

Accordingly, in this embodiment, the transformer 33 is disposed in the center portion of the end portion 55a on the nose cone 54 side of the rotation shaft 55 so that its center of gravity substantially matches the center axis of the rotation shaft 55. Thus, increase in inertial moment of a not-illustrated windmill rotor is suppressed, increase in time constant of rotation of the windmill is suppressed, and the following ability of the large windmill 50 at the time of wind velocity/wind direction variation or cut in/cut out can be retained.

Thus, in this embodiment, plasma can be generated on the blade 14 without applying a high voltage to the sliding type transmission unit 35 (rings 35a), and improvement in durability, reduction in vibrations and noise, improvement in aerodynamic performance, and the like can be achieved. As a result, the high-frequency high voltage can be supplied stably with low noise even while the rotation apparatus is operating.

Note that in this embodiment, although only the transformer 33 is disposed in the center portion of the end portion 55a of the rotation shaft 55 so that its center of gravity substantially matches the center axis of the rotation shaft 55, but it is not limited thus. Similarly to FIG. 5, the high frequency generation unit 32 may be disposed in the end portion 55a of the rotation shaft 55.

Further, in this embodiment, the AC/DC conversion unit 31 and the high frequency generation unit 32 are disposed on the holding part (bearing 12) side. However, the AC/DC conversion unit 31, the high frequency generation unit 32, or both of them may be disposed on the rotation blade (blades 14) side.

Embodiment 6

Figure 11:
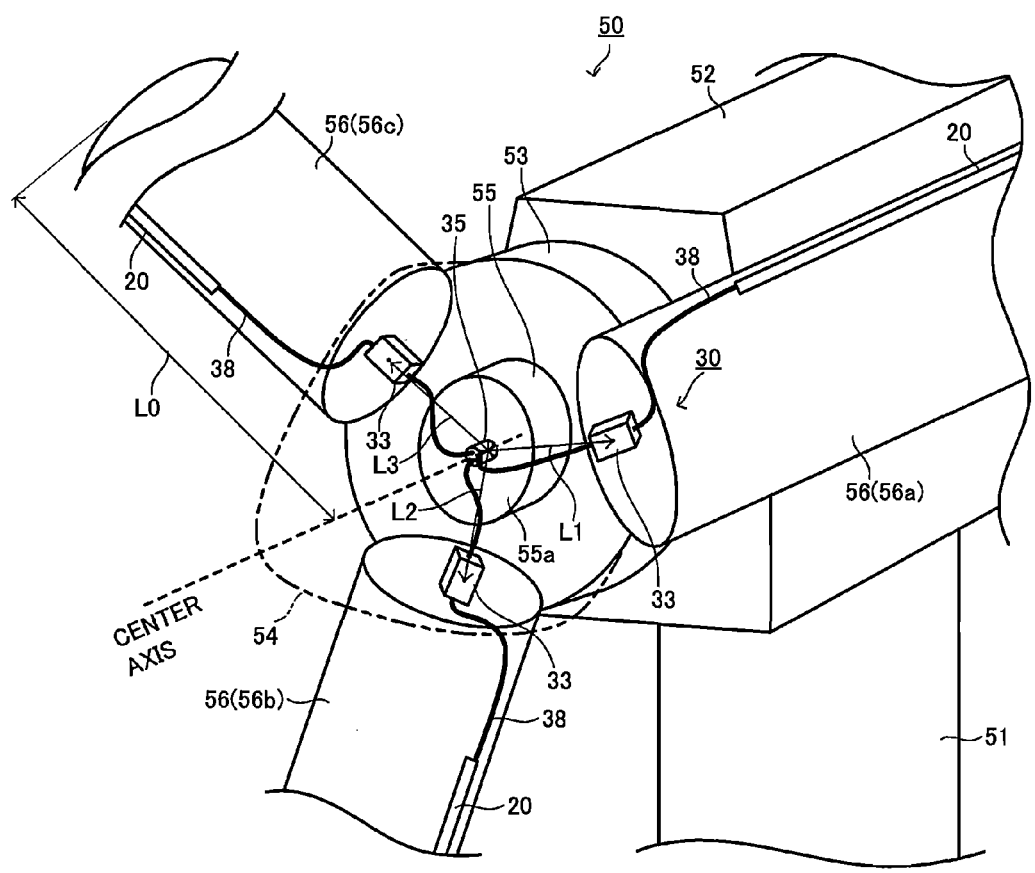
FIG. 11 is a perspective view illustrating a part of a large windmill of a wind power generation system of another embodiment.

FIG. 11 is a perspective view illustrating a part of a large windmill 50 of a wind power generation system of MW (megawatt) class of another embodiment.

As illustrated in FIG. 11, the structures of the large windmill 50 and airflow generation devices 20 are similar to those in FIG. 10, but an arrangement structure of the voltage application device 30 is different.

That is, in this embodiment, transformers 33 are disposed respectively in root portions of respective blades 56a to 56c where they are attached to the nose cone 54 so as to have, for example, substantially the same weight at substantially equal intervals from the center axis of the rotation shaft 55, thereby making the combined center of gravity of the respective transformers 33 substantially match the center axis of the rotation shaft 55.

Moreover, in this embodiment, the sliding type transmission unit 35 is disposed in the center portion of the end portion 55a on the nose cone 54 side of the rotation shaft 55, making the center of gravity of the sliding type transmission unit 35 substantially match the center axis of the rotation shaft 55.

Note that the substantially match refers to, for example, satisfying L11/L0≤5/100 where L11 is the distance between the center axis of the rotation shaft 13 and the combined center of gravity of the transformers 33 of the respective blades 14a to 14c, and L0 is the blade length.

Further, the substantially equal intervals refer to that, for example, the distances from the center axis of the rotation shaft 13 to the transformers 33 of the respective blades 14a to 14c satisfy L11/L0≤1/5, L12/L0≤1/5, and L13/L0≤1/5, respectively.

Further, when plural electrodes are disposed on one blade and control of discharge is respectively performed separately, it is necessary to provide a power supply for each electrode. For example, there is a case where three electrodes are driven with three power supplies. In this case, by disposing the three power supplies at substantially equal intervals on the circumference of a cylindrical blade root where a power supply 33 is provided in FIG. 11, it is possible to prevent the center of gravity from becoming off balance when the blade root is rotated at the time of pitch control of the blade. In this case, the power supplies are disposed so that the total center of gravity which further combines, regarding all the blades, the combined centers of gravity of the power supplies disposed on the respective blades substantially matches the center axis of the rotation shaft.

In this embodiment, the respective transformers 33 are disposed respectively in the root portions of the blades 56 so that their combined center of gravity substantially matches the center axis of the rotation shaft 55. Thus, increase in inertial moment of a not-illustrated windmill rotor is suppressed, increase in time constant of rotation of the windmill is suppressed, and the following ability of the large windmill 50 at the time of wind velocity/wind direction variation or cut in/cut out can be retained.

Thus, in this embodiment, plasma can be generated on the blade 14 without applying a high voltage to the sliding type transmission unit 35 (rings 35a), and improvement in durability, and reduction in vibrations and noise can be achieved. As a result, the high-frequency high voltage can be supplied stably with low noise even while the rotation apparatus is operating.

Next, results of an experiment as ground which led to the ideas of the above-described embodiments will be described.

In this experiment, a fan having the structure illustrated in FIG. 5 (rotation speed=500 [rpm]) and a power supply (100 [W], 3 [kg]) for high-frequency high voltage (15 [kHz], Vop=3 [kV]) were prepared to perform verification. Note that the weight of the transformer 33 was 1 [kg] and the weight of the high frequency generation unit 32 was 0.2 [kg].

First, results of an experiment aiming at noise reduction of the fan are illustrated in FIGS. 12A and 12B to FIG. 17. It is conceivable that noise of a fan is generated by a variation in wind velocity in the vicinity of the trailing edge of a rotating blade. Accordingly, the airflow generation device was disposed in the vicinity of the trailing edge of a blade of the fan, and noise in the vicinity of the fan was measured with a microphone to examine the effect of plasma.

Regarding the structure of the voltage application device, the AC/DC conversion unit, the high frequency generation unit, and the transformer were disposed on the holding side of the fan, and the examination was performed for the case of a conventional method of transmitting the high-frequency high voltage to the rotation side of the fan via a sliding type transmission unit, and a power supply A and a power supply B which will be described later.

Figure 12A:
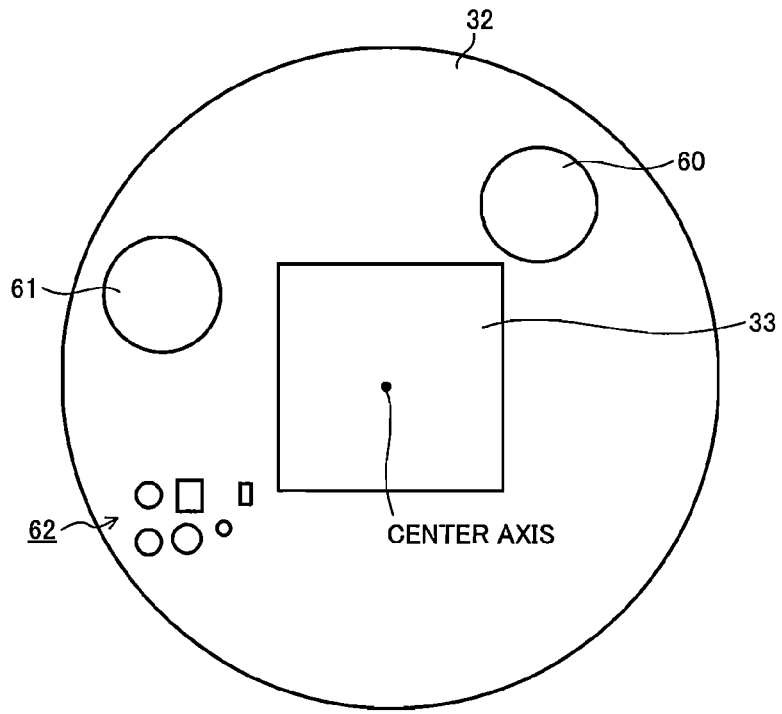
FIGS. 12A and 12B are diagrams of the case where a transformer is disposed in an end portion of a rotation shaft of a fan.
Figure 12B:
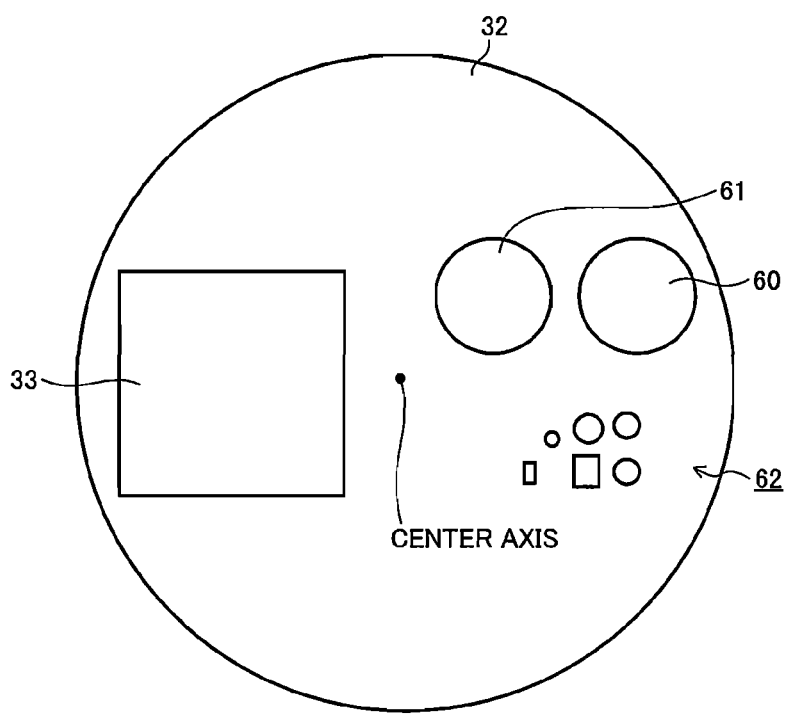

FIGS. 12A and 12B are diagrams in which the transformer 33 is disposed in an end portion of a rotation shaft of the fan, where FIG. 12A is a diagram in the case of using a voltage application device (hereinafter referred to as "power supply A") in which the transformer 33 is disposed on the center axis of this end portion, and FIG. 12B is a diagram in the case of using a voltage application device (hereinafter referred to as "power supply B") in which the transformer 33 is disposed to be deviated from the center axis of this end portion.

As illustrated in FIG. 12A, the case of power supply A presents a structure in which the transformer 33 is disposed on the center axis of the end portion of the rotation shaft of the fan so that its center of gravity substantially matches the center axis of the rotation shaft (similarly to the structure of FIG. 5). Further, the high frequency generation unit 32 in the diagram is formed on a substrate in a disc shape which can be disposed concentrically on the end portion of the rotation shaft 12 (see FIG. 5) and is disposed so that its center of gravity substantially matches the center axis of the rotation shaft, and the transformer 33 is mounted on this substrate (the same applies to FIG. 12B). Further, the slip ring (see FIG. 5) is disposed on the rotation shaft 13 to enable supply of voltage from the holding side to the rotation side (the same applies to FIG. 12B).

Further, numerals 60 to 62 in the diagrams are circuit elements, such as a diode and a resistor, for generating the high-frequency high voltage. These circuit elements are of light weight, and thus their influence on moment applied to the rotation center of the rotation shaft 13 can be ignored (the same applies to FIG. 12B).

Here, when the voltage application device 30 was driven, it was possible to generate plasma stably. Even when the rotation speed of the fan is increased to 1500 [rpm], it was still possible to generate plasma stably.

Further, as illustrated in FIG. 12B, the case of power supply B presents a structure in which the transformer 33 is disposed to be deviated from the center axis of the end portion of the rotation shaft of the fan so that its center of gravity do not substantially match the center axis of the rotation shaft. In the case of this power supply B, since the transformer 33 having a large weight is deviated from the center axis of the end portion of the rotation shaft, it is conceivable that there appears an influence on moment applied to the rotation center of the rotation shaft 13.

As plasma electrodes of the airflow generation device (see the pair of electrodes 22, 23 illustrated in FIG. 2), surface electrodes are formed uniformly in a span direction on a polyimide resin having a thickness of 250 [μm]. The discharge length of the surface electrodes is 100 [mm] per blade. The electrodes are disposed so that plasma induced flow occurs toward the trailing edge of the blade. The electrodes are disposed on both the front and rear surfaces of the blade. These conditions are the same in the case of the above-described structure of conventional method, in the case of the structure of power supply A and in the case of the structure of power supply B.

First, the present inventors obtained and compared noise spectra with discharge and without discharge using a microphone (not illustrated) disposed at a position 30 [cm] away from the blade of the fan in the structure of power supply A.

Figure 13:
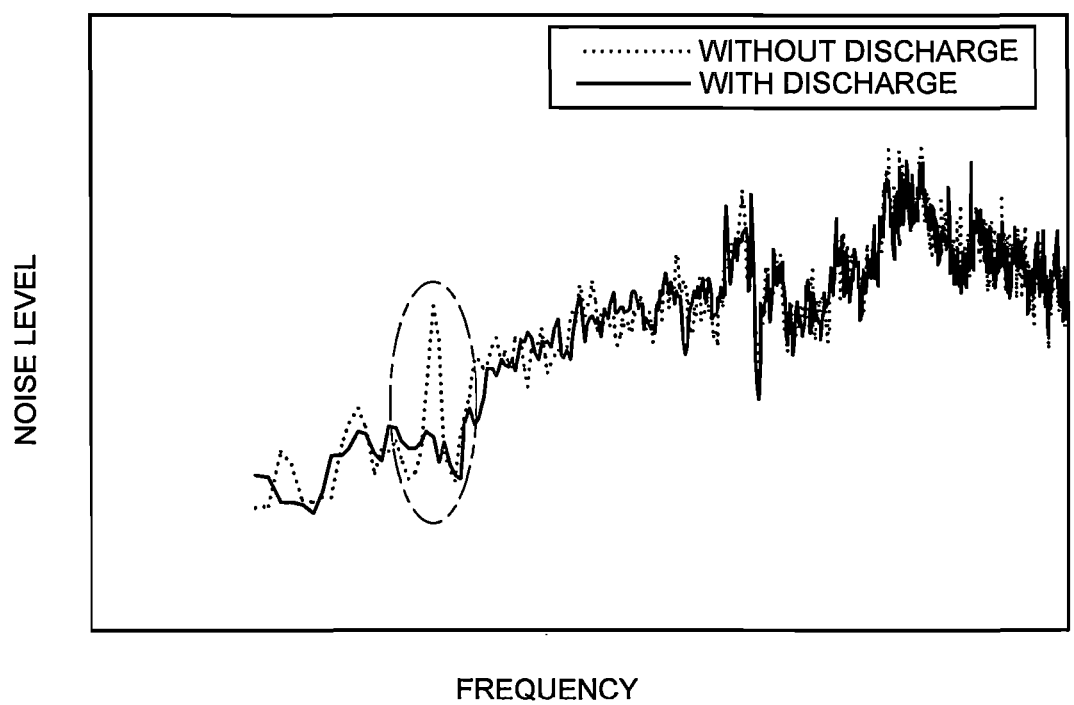
FIG. 13 is a diagram illustrating noise spectra of the fan.

FIG. 13 is a diagram illustrating the noise spectra of the fan.

As illustrated in FIG. 13, in this experiment, under the condition that the rotation speed of the fan is 500 [rpm], regarding the peak of noise occurring when there is no plasma discharge (a dotted line portion in the diagram), reduction of the peak of noise as circled with a chain-dashed line was observed when there is plasma discharge (a solid line portion in the diagram). Thus, it was made clear that the noise of rotation blades can be reduced by plasma airflow control.

Next, the present inventors obtained and compared electromagnetic noise levels, peak intensity which can be reduced by plasma in noise spectrum, vibration intensity and power supply efficiency (discharge power/primary power consumption) in the case of the above-described structure of conventional method, in the case of the structure of power supply A and in the case of the structure of power supply B. Note that in following FIG. 14 to FIG. 17, a dotted line denotes the structure of conventional method, a solid line denotes the structure of power supply A, and a chain-dashed line denotes the structure of power supply B.

Figure 14:
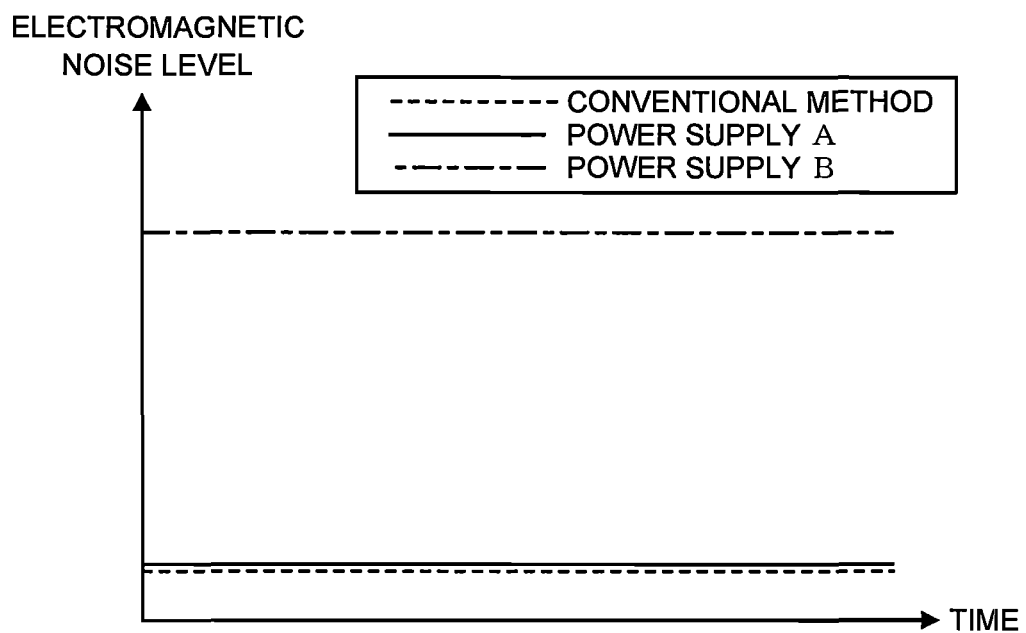
FIG. 14 is a diagram illustrating comparison results of electromagnetic noise levels.

FIG. 14 is a diagram illustrating comparison results of electromagnetic noise levels. As illustrated in FIG. 14, the electromagnetic noise levels are clearly lower in the cases of the structures of power supply A (solid line) and power supply B (chain-dashed line) than in the structure of the conventional method (dotted line), and this indicates that the electromagnetic noise is reduced by lowering the supply voltage to the sliding type transmission unit.

Figure 15:
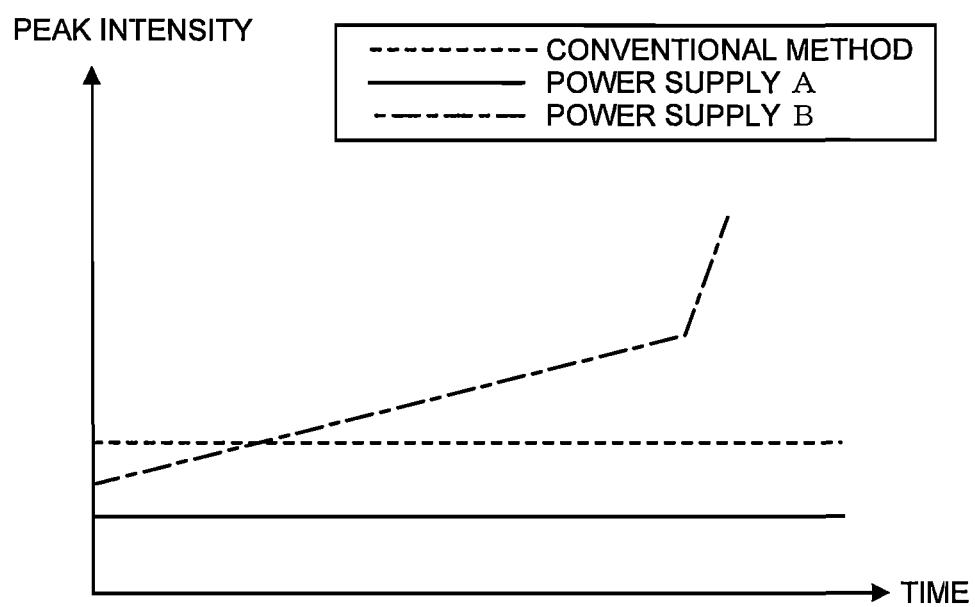
FIG. 15 is a diagram illustrating comparison results of peak intensity which can be reduced by plasma in noise spectrum.

FIG. 15 is a diagram illustrating comparison results of peak intensity which can be reduced by plasma in noise spectrum. As illustrated in FIG. 15, in the case of the structure of power supply A (solid line), the peak intensity is reduced stably, but in the case of the structure of power supply B (chain-dashed line), the peak intensity increases gradually and the noise increases rapidly in the middle. This is because noise due to vibrations is large in the state of 500 [rpm] since the transformer 33 is not located on the center axis of the rotation shaft, and this is overlapped on aerodynamic noise as the target.

Further, at the point of the rapid increase, the fixing part of the transformer 33 was about to break in the case of the structure of power supply B and then broke eventually, and hence the test was stopped. The case of the structure of conventional method (dotted line) is stable but produces more noise than the case of power supply A. This is because discharge sound in the sliding type transmission unit is overlapped. The above results indicate that the peak intensity of noise can be reduced stably by lowering the supply voltage to the sliding type transmission unit and disposing the transformer 33 on the center axis of the rotation shaft.

Figure 16:
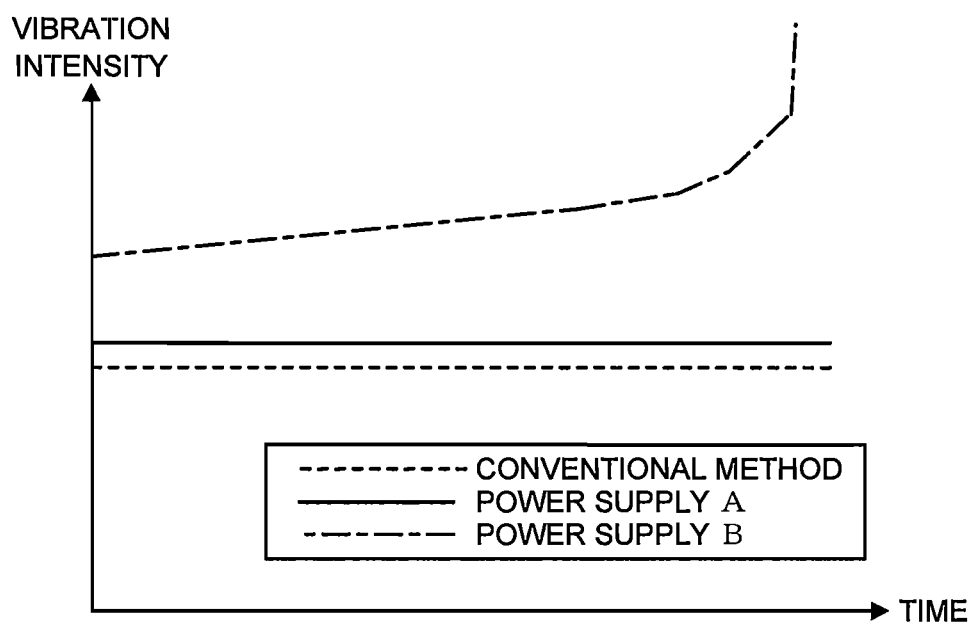
FIG. 16 is a diagram illustrating comparison results of vibration intensity.

FIG. 16 is a diagram illustrating comparison results of vibration intensity. The vibration intensity illustrated in FIG. 16 was measured with a not-illustrated accelerometer disposed in the casing 11 (see FIG. 5) of the fan 10.

The case of the structure of power supply B (the chain-dashed line in the diagram) is large in vibration compared to the cases of the other structures (dotted line and solid line in the diagram), increases in vibration intensity gradually, and increases rapidly in vibration in the middle. This is because vibrations are large in the state that the rotation speed of the fan 11 (see FIG. 5) is 500 [rpm] since the transformer 33 is not located on the center axis of the rotation shaft 13.

Further, at the point of the rapid increase, the fixing part of the transformer 33 of power supply B was about to break and then broke eventually, and hence the test was stopped. The above results indicate that noise can be reduced and a highly reliable voltage application device 30 can be achieved by disposing the transformer 33 on the center axis of the rotation shaft.

Figure 17:
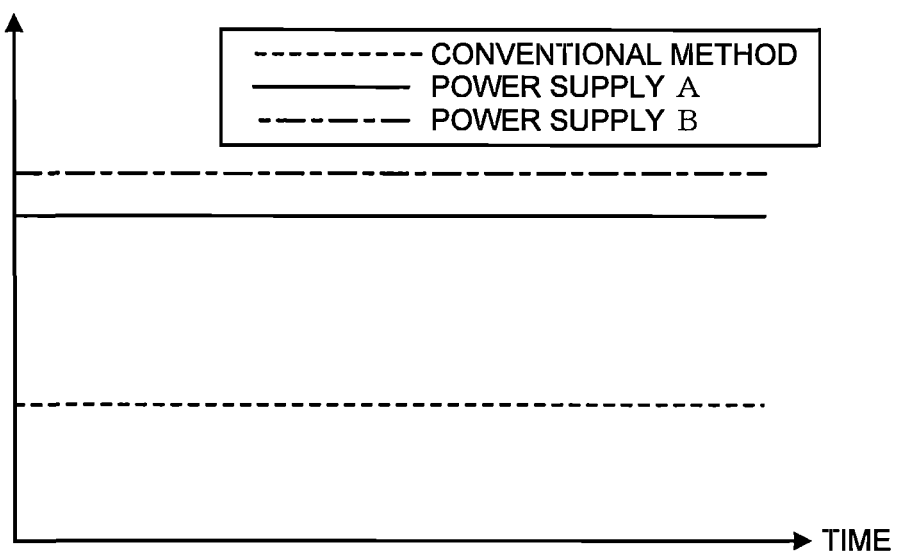
FIG. 17 is a diagram illustrating comparison results of power supply efficiency.

FIG. 17 is a diagram illustrating comparison results of power supply efficiency. The power supply efficiency illustrated in FIG. 17 was evaluated by dividing discharge power by primary power consumption. In either case of the structures of power supply A (solid line in the diagram) and power supply B (chain-dashed line in the diagram), the efficiency is higher than the case of the structure of conventional method (dotted line in the diagram). This indicates that heat loss can be reduced and a highly efficient voltage application device 30 can be achieved by avoiding needless discharge in the sliding type transmission unit by reducing the supply voltage to the sliding type transmission unit.

According to the above-described comparison results, it was found that by disposing on the rotation shaft 13 at least the transformer 33 in the voltage application device 30 so that its center of gravity substantially matches the center axis of the rotation shaft 13, a high-frequency high voltage needed in the airflow generation device 20 can be supplied stably and efficiently with low noise from the holding side onto the rotating blades, and reliability increases even under inertial forces by a rotation field.

Further, also when at least the transformers 33 in the voltage application device 30 are disposed in a distributed manner on plural blades 14, the combined center of gravity of these transformers 33 substantially matches the center axis of the rotation shaft 13. Thus, similarly to the above, it is easily conceivable that a high-frequency high voltage needed in the airflow generation devices 20 which are disposed in a distributed manner on the respective blades 14 can be supplied efficiently and stably with low noise from the holding side onto the rotating blades, and reliability increases even under inertial forces by a rotation field.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voltage application device for applying a voltage between a first electrode and a second electrode disposed separately from each other in an airflow generation device, the airflow generation device disposed on rotation blades of a rotation apparatus, the rotation apparatus having a holding part and a rotation shaft held by the holding part, the rotation blades attached to the rotation shaft, the voltage application device comprising:

an AC/DC converter for converting a voltage of a commercial frequency into a direct-current voltage;

a high frequency generator for generating an alternating voltage based on the direct-current voltage converted by the AC/DC converter;

slip rings disposed on a rotation blade side and a holding part side of the rotation shaft for transmitting the alternating voltage or direct current voltage from the holding part side to the rotation blade side; and transformers for increasing the alternating voltage generated by the high frequency generator and outputting the increased voltage between the first electrode and the second electrode, the transformers being disposed in the rotation blades so that a combined center of gravity thereof substantially matches a center axis of the rotation shaft.

2. A rotation apparatus comprising the voltage application device according to claim 1.

3. The voltage application device according to claim 1, wherein the slip rings transmit the commercial frequency to the AC/DC converter.

4. A rotation apparatus comprising the voltage application device according to claim 3.

5. The voltage application device according to claim 1, wherein the slip rings transmit the direct current voltage from the AC/DC converter.

6. A rotation apparatus comprising the voltage application device according to claim 5.

7. The voltage application device according to claim 1, wherein the slip rings transmit the high frequency voltage from the high frequency generator.

8. A rotation apparatus comprising the voltage application device according to claim 7.

9. The voltage application device according to claim 1, wherein the slip ring has a ring and a brush in electrical contact with the ring.

10. A rotation apparatus comprising the voltage application device according to claim 9.

11. The voltage application device according to claim 3, wherein the slip ring has a ring and a brush in electrical contact with the ring.

12. A rotation apparatus comprising the voltage application device according to claim 11.

13. The voltage application device according to claim 5, wherein the slip ring has a ring and a brush in electrical contact with the ring.

14. A rotation apparatus comprising the voltage application device according to claim 13.

15. The voltage application device according to claim 7, wherein the slip ring has a ring and a brush in electrical contact with the ring.

16. A rotation apparatus comprising the voltage application device according to claim 15.

* * * * *